Nov. 28, 1961  A. C. DUCATI  3,011,106
CAPACITOR ASSEMBLY
Filed May 1, 1958  2 Sheets-Sheet 1
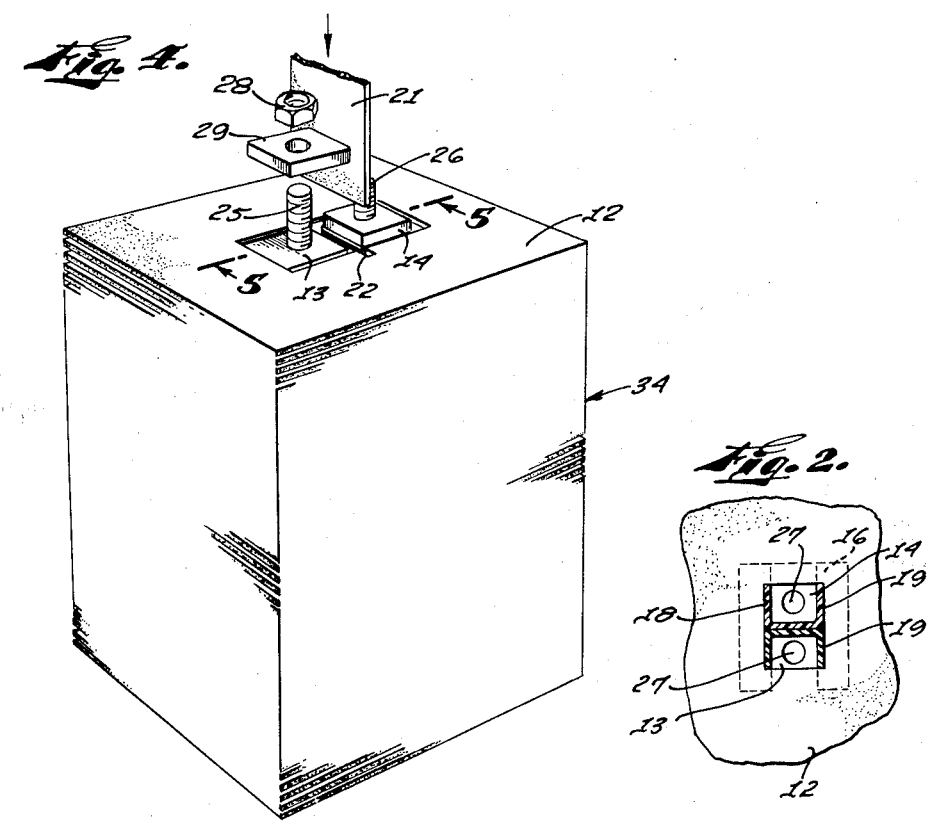
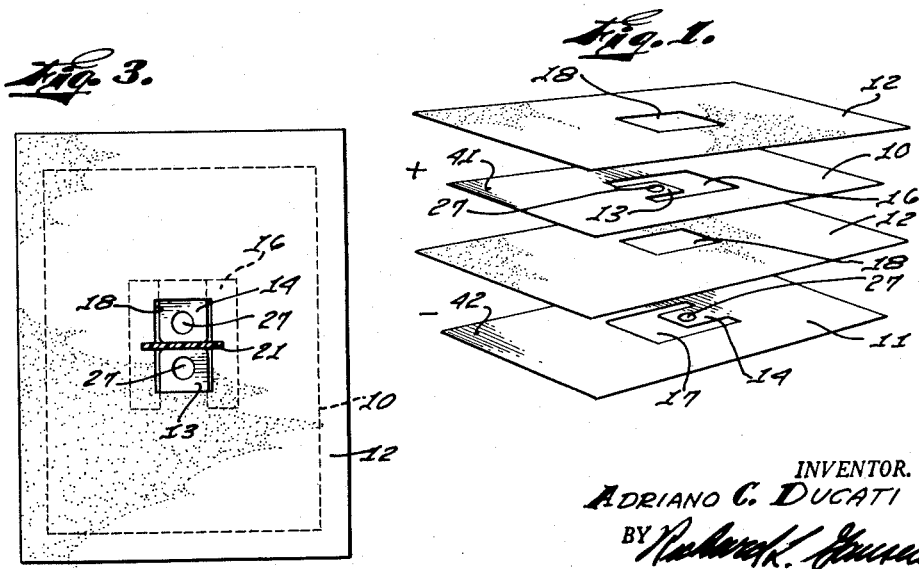
INVENTOR.
ADRIANO C. DUCATI
BY
ATTORNEY

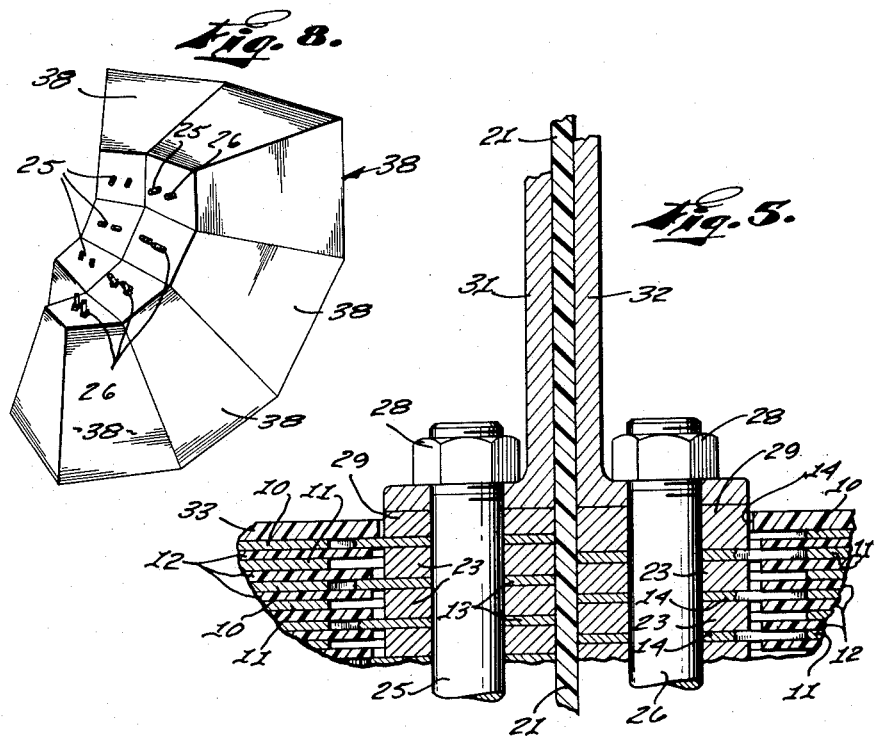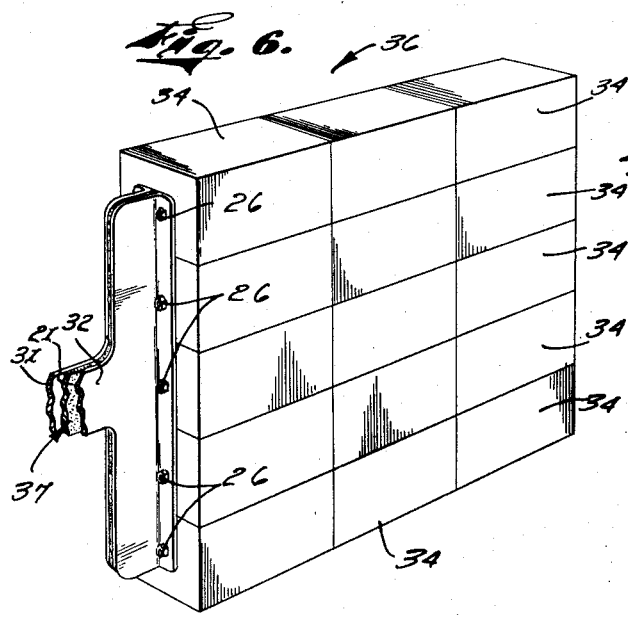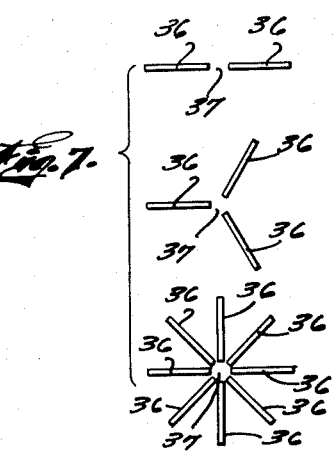

U̶n̶i̶t̶e̶d̶ ̶S̶t̶a̶t̶e̶s̶ ̶P̶a̶t̶e̶n̶t̶ ̶O̶f̶f̶i̶c̶e̶

3,011,106
CAPACITOR ASSEMBLY
Adriano C. Ducati, Corona del Mar, Calif., assignor, by mesne assignments, to Plasmadyne Corporation, Santa Ana, Calif., a corporation of California
Filed May 1, 1958, Ser. No. 732,344
9 Claims. (Cl. 317—261)

This invention relates to a capacitor assembly having a low inductance, and includes both the individual capacitor elements and the means for electrically connecting the same.

There are a number of situations in which it is desirable to employ capacitors having a very low inductance, in order that the electricity stored in the capacitors may be discharged in an extremely short period of time. It is now possible to discharge certain capacitors in a time period measured in thousandths of a second, but there are a number of applications in which the capacitor discharge should be measured in millionths of a second or even fractions thereof. Such situations include commercial operations, for example radar, and also include research operations in the field of physics.

Not only is it necessary that the individual capacitor units discharge extremely rapidly, but it is necessary that the connections to the individual units be such as to have a very low inductance permitting a rapid discharge. The invention therefore comprises not only the individual capacitor elements but also the means for connecting individual units together in various stacks, and for arranging the stacks in a manner resulting in a high instantaneous current at a predetermined area or location.

In view of the above and other factors characteristic of capacitor assemblies, it is an object of the present invention to provide an improved capacitor assembly having an extremely low inductance, making it possible to effect capacitor discharge in microseconds and to obtain very high instantaneous currents in predetermined locations.

Another object is to provide a novel capacitor unit which is simple to manufacture and assemble, and which may be stacked together in a wide variety of low-inductance assemblies adapted to deliver high currents to predetermined locations.

A further object is to provide a plate-type capacitor assembly in which the electrical connections are made at the central portions of the plates instead of at the peripheral portions thereof.

These and other objects and advantages of the invention will be more fully set forth in the following specification and claims, considered in connection with the attached drawings to which they relate.

In the drawings:

FIGURE 1 is an exploded perspective view illustrating individual components of a single capacitor unit;

FIGURE 2 is a fragmentary plan view illustrating the elements of FIGURE 1 after assembly thereof into flatwise engagement, and after mounting of insulation around the tabs or ears;

FIGURE 3 is a plan view corresponding to FIGURE 2 but illustrating the upper insulation sheet in full, and showing a second type of insulation between the tabs;

FIGURE 4 is a perspective, partially exploded view showing a stack of the capacitor units of FIGURE 3, with the cover removed;

FIGURE 5 is an enlarged, fragmentary vertical sectional view taken on line 5—5 of FIGURE 4;

FIGURE 6 is a fragmentary perspective view illustrating a bank of stacks, of the type shown in FIGURE 4, in superposed relationship and connected by low-inductance connectors;

FIGURE 7 is a highly schematic plan view illustrating various arrangements of the banks of FIGURE 6; and FIGURE 8 is a perspective view illustrating, in fragmentary form, a plurality of capacitor stacks shaped as truncated pyramids and adapted to discharge at a central region.

In the following specification and claims, the word "plates" is employed to denote the electrically-conductive components of the capacitor stacks, but it is to be understood that such components may be very thin and flexible and may in some instances be more properly designated as sheets or even coatings. The dielectric elements between such plates are generally referred to as "sheets," but it is to be understood that the dielectric may comprise coatings, paste substances, etc.

Referring to the drawings and particularly to FIGURE 1 thereof, the two plates of each capacitor unit are designated 10 and 11, respectively, and each sheet of dielectric is designated 12. The plates 10 and 11 are preferably planar and relatively thin, being formed of a suitable conductor such as aluminum. The dielectric sheets 12 should be thin and may comprise, for example, sheets of paper or plastic.

The plates 10 and 11 are formed, respectively, with tabs, lugs or ears 13 and 14 which are located relatively close to each other when the unit is assembled. Tabs 13 and 14 are preferably integral with the respective plates 10 and 11, although they may also be separately formed and then connected to the plates in a suitable manner. The tabs are so located that when a number of capacitor units are stacked, as will be described subsequently, the tabs may be connected to separate electrical connectors extending perpendicular to the plates in relatively closely spaced, parallel relationship.

Tabs 13 and 14 are spaced inwardly from the peripheral parts of the main bodies of the plates 10 and 11, being preferably located in the central portions of the plates. More particularly, the tabs are disposed in central openings 16 and 17 formed, respectively, in plates 10 and 11 and adapted to register with each other when the plates are stacked. The positions of the tabs 13 and 14 in the openings 16 and 17 is such that all of the tabs 13 are in alignment with each other, as are all the tabs 14, so that electrical connectors may be extended through the openings 16 and 17 and connected to the tabs. Such connectors, as previously indicated, extend generally perpendicular to the plates 10 and 11 and in relatively closely spaced relationship.

The sheets 12 of dielectric are also provided with openings, numbered 18, adapted to register with the openings 16 and 17 to form a passage extending through the stack of plate and dielectric elements. The illustrated plates and sheets 10–12 are rectangular, with the plates being somewhat smaller than the sheets of dielectric in order to prevent arcing between the plates. The openings 16, 17 and 18 are also rectangular, in the illustrated embodiment, the openings 18 in the dielectric being smaller than those in the plates in order to lengthen the air gaps between the plates. Plates 10 and 11 are shown as being of identical construction except that they are rotated 180 degrees from each other in order that the tabs 13 and 14 therein will face in opposite directions. Tabs 13 and 14, which are also shown as being rectangular and extending from one end of each opening 16 and 17, respectively, each occupy less than half the length of such opening in order to provide room for insulation between the tabs when the plates are stacked.

Referring particularly to FIGURE 2, the plate and sheet elements of FIGURE 1 are engaged in flatwise, stacked relationship, with the openings 16–18 in registry. A U-shaped insulator element 19 is mounted around each tab 13 and 14 to prevent arcing therebetween. Such insulators 19 may be relatively long, that is to say channel shaped, when a large number of capacitor units are stacked together.

Referring to FIGURE 3, a second embodiment is shown in which the U-shaped insulators 19 are replaced by a strip 21 disposed between the tabs 13 and 14. Strip 21 is wider than the tabs, and extends into notches 22 (FIGURE 4) provided at opposite sides of the openings 18 in the dielectric. A relatively long air gap is thus formed between tabs 13 and 14, without the necessity of providing U-shaped insulators.

Referring next to FIGURES 4 and 5, there is shown the means for mounting a large number of capacitor units in a stack. This is accomplished by stacking the elements 10–12 together and providing an electrically-conductive washer or spacer 23 between each pair of adjacent tabs 13 and each pair of adjacent tabs 14. Spacers 23 may be rectangular, and extend clear to strip 21. Electrically-conductive connectors 25 and 26 are then extended through the washers 23 and through holes 27 in the respective tabs 13 and 14. The connectors 25 and 26 are shown as taking the form of long bolts having nuts 28 and electrically-conductive washers 29 at their ends to facilitate connection of buss bars 31 and 32, respectively. An insulating cover 33 is illustrated, in FIGURE 5 only, as provided above the uppermost plate 10. The nuts 28 are relatively tight, so that contact resistance between the washers or spacers is minimized.

It is emphasized that the washers 23 and 29 combine with bolts 25 and 26 to form massive electrical conductors extending perpendicular to the plates. Such massive conductors are located parallel and very close to each other, being separated only by the thickness of insulation 21, which insulation is made only as thick as necessary to prevent breakdown. This greatly reduces the inductance of the assembly, as will be stated subsequently.

The buss bars 31 and 32 are also located parallel and closely adjacent each other. In the illustrated embodiment, the buss bars comprise angle bars having webs, which are clamped beneath nuts 28, and having upwardly extending flanges. Such flanges are large in size, and are separated only by the thickness of insulation which comprises an extension of insulation 21.

Referring next to FIGURE 6, a plurality of capacitor stacks of the type shown in FIGURE 4, and which have been given the reference numeral 34, are shown as mounted in adjacent parallel relationship to form a large bank 36. More particularly, the various capacitor stacks 34, each comprising an elongated rectangular body, are shown as mounted in superposed relationship with corresponding surfaces separated by suitable insulation, not shown. Buss bars 31 and 32 are shown in FIGURE 6 as extending parallel and adjacent to each other, vertically in the illustration, so as to transmit current to a load which may be disposed at 37.

Referring next to FIGURE 7, various numbers of banks 36, of the type shown in FIGURE 6, are shown as radiating outwardly from the region 37 where a load may be connected. It is pointed out that substantially any number of banks 36 may be provided around the load region 37, in accordance with the current requirements and other factors. This arrangement is a highly practical one making use of simple connections, and facilitating inspection and removal of the load.

The arrangement illustrated in FIGURES 6 and 7 is one of a large number in which the present capacitor assembly may be employed. Referring to FIGURE 8, there is shown another arrangement whereby current may be conducted from the individual capacitor units to a central point. In the FIGURE 8 construction, the capacitor stacks 38 are shaped as truncated pyramids and correspond to the stacks shown in FIGURE 4 except that the plates and sheets become progressively larger from one end to the other. When a number of the stacks 38 are put together in the general manner shown fragmentarily in FIGURE 8, a capacitor may be constructed which is generally spherical in shape and which is hollow at the center, in order to permit connection of a load at the center.

The various sheets and plates may be shaped other than as rectangles. For example, the plates and sheets may be hexagonal or circular.

*Operation*

The capacitor assembly of the present invention has an extremely low inductance because the effect of each current flowing therein, including in the connectors, is substantially cancelled by a corresponding current flowing adjacent thereto and in the opposite direction. Assuming that the capacitor assembly has been charged from a suitable source of direct current, the currents flowing upon discharge thereof are equal, opposite and adjacent each other in each instance. The result is that the magnetization produced by the currents is effectively nullified or compensated for, and the inductance of the assembly is accordingly minimized. It follows that the present capacitor assembly is capable of discharging in a matter of microseconds, and of generating currents measured in millions of amperes.

Let it be assumed that the polarity is such that each plate 10 is charged positively and each plate 11 is charged negatively. Upon discharge of the assembly, current will flow from each point in each plate 10 toward the tab 13 in such plate, and current will also flow from the tab 14 in each plate 11 into the body portion of such plate. These currents are equal and opposite along any path. For example, assuming that a current is flowing from point 41 on plate 10 (FIGURE 1) toward tab 13 on such plate, a corresponding current will flow from tab 14 on plate 11 to point 42 thereon, which is closely adjacent point 41. Although the paths of such current flows in plates 10 and 11 do not always correspond exactly, they are sufficiently close that the electrical effects of the currents are cancelled out to produce a very low-inductance. This cancelling action is very effective because plates 10 and 11 are close together, being separated only by a dielectric sheet 12 which is preferably very thin.

Currents of the above-indicated type flow in each plate 10 and 11 on discharge of the capacitor assembly, so that there is very little inductance in the stack of plates 10 and 11. Furthermore, there is very little inductance in the connector bolts 25 and 26 and surrounding washers, since these are disposed close to each other and in parallel relationship, and since the current flow therein is in opposite directions. Thus, for example, the current flowing from point 41 to tab 13 (FIGURE 1) enters connector bolt 25 (and washers 23) and flows upwardly (FIGURES 4 and 5). This current is compensated for by current flowing downwardly through connector bolt 26 (and washers 23) into tab 14, and through plate 11 to point 42 (FIGURE 1). The same applies to the buss bars 31 and 32 since these, as stated previously, are disposed in parallel and adjacent relationship. It follows that there is very little inductance not only in the plates but also in the rods 25 and 26 (including washers 23 and 29) and buss bars 31 and 32, so that an extremely high current may be delivered in a very short period of time.

The various plates of the capacitor assembly need not lie in a single plane. They may, for example, be curved or cone-shaped.

It is an important feature of the invention that the connectors 25 and 26, and associated washers or spacers, extend clear through each stack. It is thus possible, through short low-inductance connectors (not shown), to connect a number of stacks or units in end-to-end relationship. The units thus connected may have corresponding shapes and sizes, or may have different shapes and sizes. As an example of such low-inductance connectors, male and female connectors may be provided at opposite ends of each unit so that any number of stacks or units may be connected (by plugging) end-to-end. The tall stacks 38 shown in the drawings may then, in this manner, comprise a number of longitudinally-connected short stacks.

Various embodiments of the present invention, in addition to what has been illustrated and described in detail, may be employed without departing from the scope of the accompanying claims.

I claim:

1. A low-inductance capacitor, which comprises a plurality of electrically-conductive plates mounted in stacked relationship and parallel to each other, a sheet of dielectric provided between each pair of adjacent plates to maintain the same electrically separate, said plates and sheets having generally corresponding openings formed in the mid-portions thereof and defining a passage extending through the stack generally perpendicular to said plates and sheets, a first electrical conductor extended through said passage and electrically connected to each alternate plate, and a second electrical conductor extended through said passage in spaced parallel relationship from said first conductor and electrically connected to the remaining alternate plates.

2. The invention as claimed in claim 1, in which the electrical connections between said conductors and said plates are made to tabs provided on said plates in said openings, and in which said conductors in said passage are disposed close to each other in order that current flowing in opposite directions therethrough will provide an inductance-cancelling action.

3. A low-inductance capacitor assembly, which comprises a substantial number of stacked electrically-conductive plates each having an opening in the central portion thereof, each of said plates having a tab formed integrally thereon and extending into said opening, each alternate plate being so disposed that the tabs thereon correspond and are in general alignment, the remaining alternate plates being so disposed that the tabs thereon are also in general alignment but are offset from the tabs on the first-mentioned alternate plates, a sheet of dielectric provided between each pair of adjacent plates and having an opening therein which forms, together with the openings in said plates, a passage through the stack of plates and sheets, a first conductor provided in said passage and connected to the tabs on said first-mentioned alternate plates, and a second conductor provided in said passage and connected to the tabs on the second-mentioned alternate plates.

4. The invention as claimed in claim 3, in which said conductors are disposed close to each other in order that the currents flowing therein will provide an inductance-cancelling action.

5. The invention as claimed in claim 3, in which said plates are all shaped correspondingly, in which said first-mentioned set of alternate plates is rotated 180 degrees away from said second-mentioned set of alternate plates in order that the tabs thereon will face in opposite directions, and in which said electrical conductors are extended through holes in the respective tabs.

6. The invention as claimed in claim 5, in which electrically conductive spacers are provided around said conductors between the respective tabs.

7. A low-inductance capacitor assembly, which comprises a multiplicity of stacked parallel electrically-conductive plates, dielectric means to separate said plates from each other, a first set of electrically-conductive tabs electrically connected to alternate ones of said plates and arranged in a first row which extends transverse to said plates, a first set of electrically-conductive spacers disposed respectively between said tabs and in low-resistance electrical contact therewith, said spacers and tabs combining to form a first electrical conductor, said tabs and spacers being so shaped that at least one side of said first electrical conductor is substantially continuous, a second set of electrically-conductive tabs electrically connected to the remaining alternate ones of said plates and arranged in a second row parallel with and adjacent said first row, a second set of electrically-conductive spacers disposed respectively between said tabs in said second set and in low-resistance electrical contact therewith, said second sets of tabs and spacers combining to form a second electrical conductor and being so shaped that at least one side of said second electrical conductor is substantially continuous, said tabs and spacers in said first and second sets thereof being so shaped and arranged that said substantially continuous sides of said first and second conductors are parallel and closely adjacent each other, and a thin strip of insulation disposed between said adjacent parallel sides of said conductors to maintain said conductors insulated from each other.

8. A low-inductance capacitor assembly, comprising a multiplicity of electrically-conductive plates disposed in spaced parallel relationship and separated by insulation means, first elongated conductor means extended transversely through the mid-portions of said plates in inwardly-spaced relationship from the peripheries thereof, said first conductor means being electrically connected to alternate ones of said plates and electrically insulated from the remaining alternate ones of said plates, and second elongated conductor means extended transversely through the mid-portions of said plates closely adjacent and parallel to said first conductor means, said second conductor means being electrically connected to said remaining alternate ones of said plates and electrically insulated from said alternate ones of said plates and from said first conductor means.

9. A low-inductance capacitor assembly comprising electrically-conductive stacked plate means formed of at least one stack of parallel electrically-conductive plates separated by thin sheets of dielectric, said plate means having a single gap or opening provided transversely therethrough in the central portion thereof, at least two electrical conductor means disposed parallel and closely adjacent each other in said gap or opening, and means to connect said two conductor means to different alternate sets of plates in said plate means, said two conductor means being electrically insulated from each other, each of said two conductor means being insulated from the remaining alternate set of plates in said plate means.

References Cited in the file of this patent

UNITED STATES PATENTS

| | | |
|---|---|---|
| 1,671,148 | Deutschmann | May 29, 1928 |
| 1,801,050 | London | Apr. 14, 1931 |
| 1,871,492 | Brennecke | Aug. 16, 1932 |
| 2,223,061 | Ducati | Nov. 26, 1940 |
| 2,373,098 | Brennan | Apr. 10, 1945 |
| 2,430,433 | Minnium | Nov. 4, 1947 |
| 2,473,240 | Byrne | June 14, 1949 |
| 2,495,062 | Henderson | Jan. 17, 1950 |